United States Patent [19]

Wiant et al.

[11] Patent Number: 4,457,546
[45] Date of Patent: Jul. 3, 1984

[54] BUMPER ASSEMBLY FOR TRAILER

[75] Inventors: Morris N. Wiant, Wichita; Frank T. Schmidt, Mulvane, both of Kans.

[73] Assignee: The Coleman Company, Inc., Wichita, Kans.

[21] Appl. No.: 392,810

[22] Filed: Jun. 28, 1982

[51] Int. Cl.³ .............................................. B60R 19/02
[52] U.S. Cl. .................................... 293/102; 293/154; 280/47.12; 280/47.26; 296/31 P
[58] Field of Search ............... 282/47.12, 47.23, 47.33, 282/47.26, 651, 652, 653, 79.2; 298/2; 296/31 P; 293/102, 1 R, 117, 154

[56] References Cited

U.S. PATENT DOCUMENTS

| | | | |
|---|---|---|---|
| 2,102,684 | 12/1937 | Dorward | 298/2 |
| 2,124,956 | 7/1938 | Roemer | 280/47.12 |
| 2,189,079 | 2/1940 | Mueller | 280/47.12 |
| 3,218,090 | 11/1965 | Herman | 280/47.26 |
| 3,858,929 | 1/1975 | Brescia | 280/47.12 |
| 3,862,695 | 1/1975 | Elliot | 280/47.12 |
| 4,070,060 | 1/1978 | Howard | 280/79.2 |

Primary Examiner—Robert R. Song

[57] ABSTRACT

A trailer is provided with a bumper assembly which protects the rear end of the trailer and which can support the trailer in an upright position. The bumper assembly includes a pair of generally U-shaped bumpers or skid bars. The lower end of each bumper is attached to the frame or chassis of the trailer, and the upper end of each bumper is attached to a connecting plate which extends between the bumpers. The connecting plate includes an L-shaped angle portion which engages a reinforcing tube which is attached to the top of the trailer.

8 Claims, 6 Drawing Figures

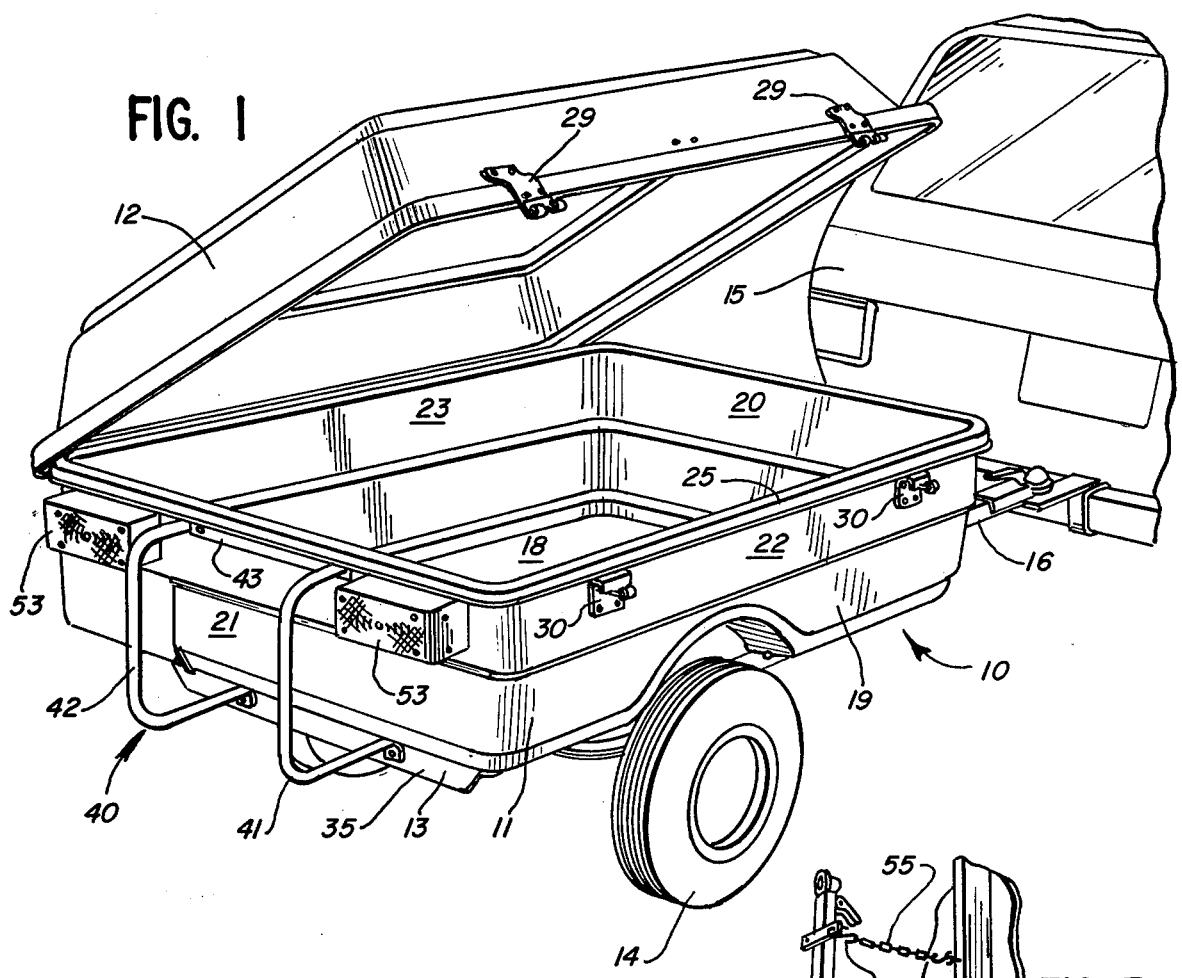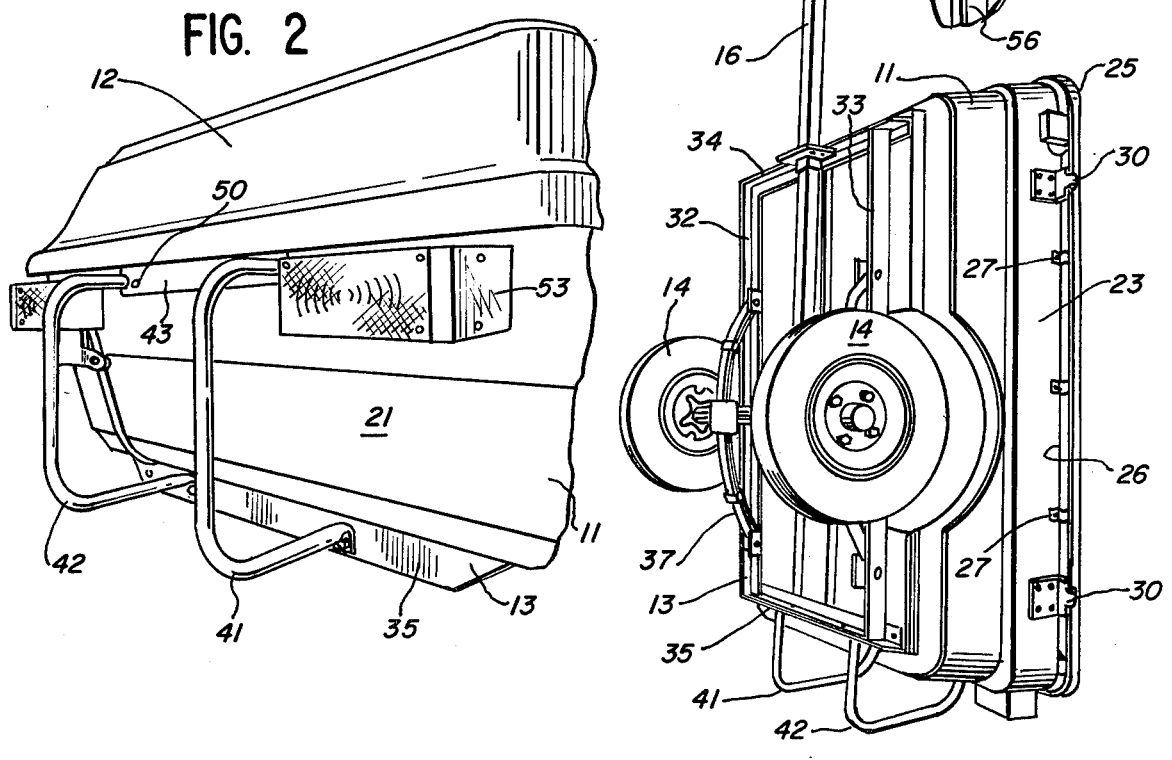

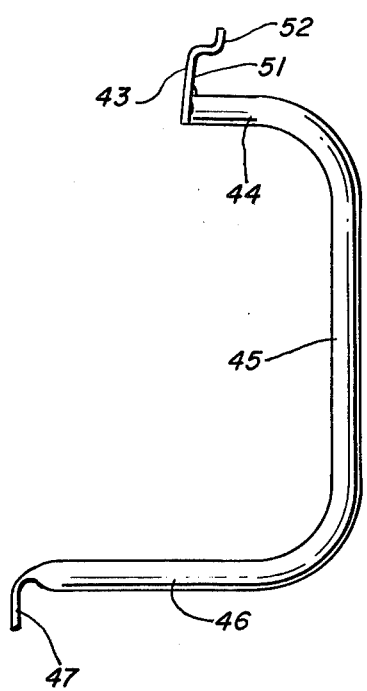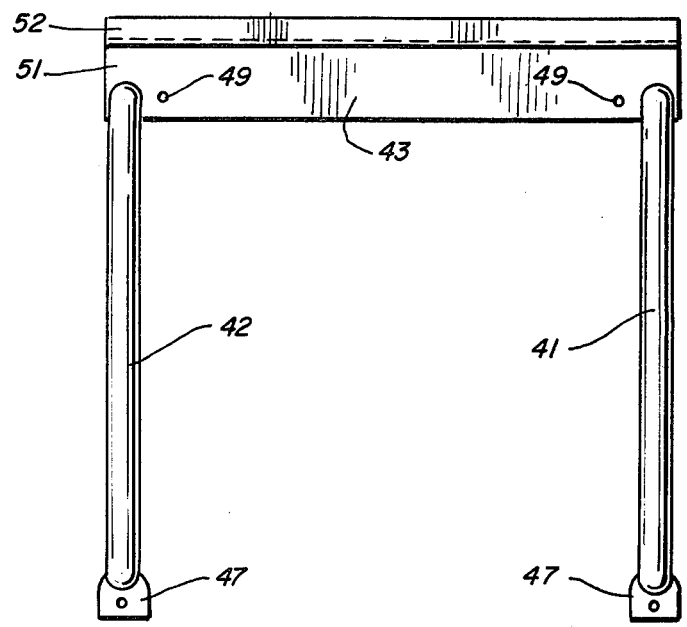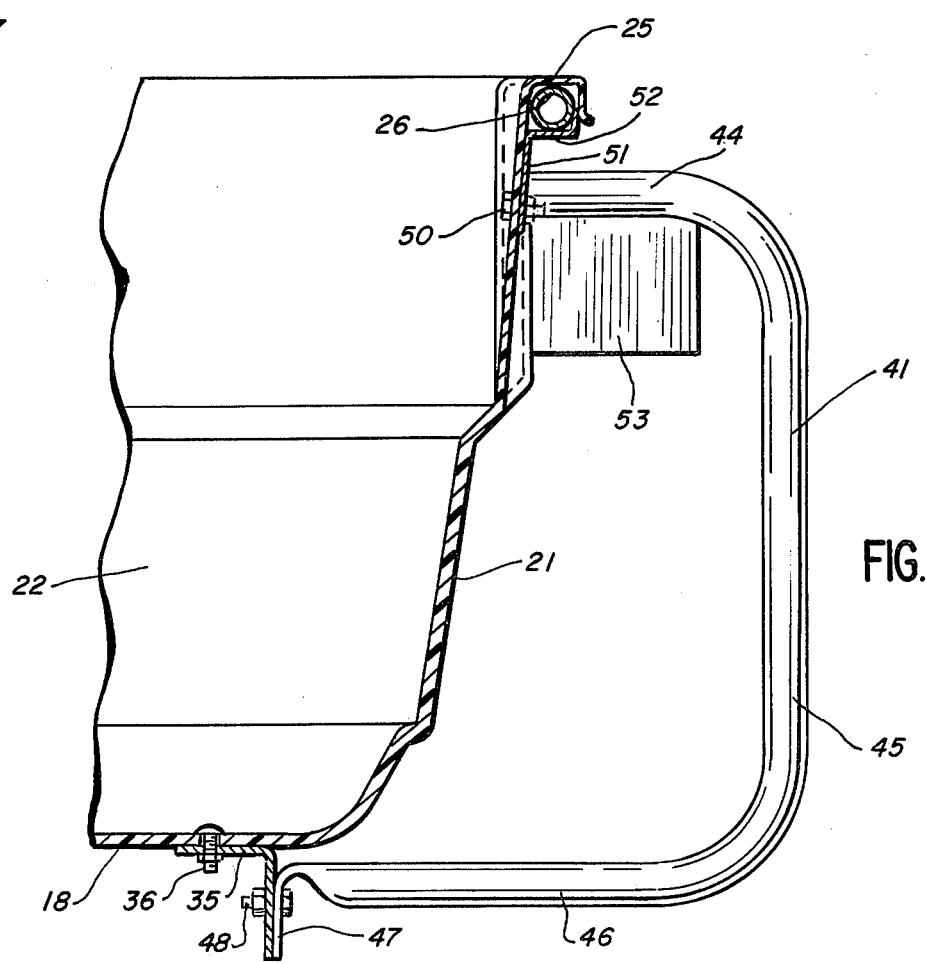

BUMPER ASSEMBLY FOR TRAILER

BACKGROUND AND SUMMARY

This invention relates to a bumper assembly for a trailer, and, more particularly, to a bumper assembly which not only protects the rear end of the trailer but also permits the trailer to be tilted to an upright position for emptying the trailer and for storing the trailer.

In the past, some trailers or carts have been provided with bumpers which permit the trailer to be tilted in order to empty the contents of the trailer. For example, U.S. Pat. Nos. 2,124,956, 2,189,079, and 3,862,695 describe carts or trailers with bumpers which permit the carts to be tilted to an upright position for emptying the carts and for storing the carts.

The carts or trailers of these patents have rigid bodies, and there is no difficulty in attaching the bumpers to the rigid body. However, there are certain advantages to a trailer body which is molded from plastic. For example, a plastic trailer body is lightweight, economical, and durable. If a plastic trailer body is provided with a bumper structure for supporting the trailer on end, the plastic body might be deformed excessively when the trailer is supported by the bumpers.

U.S. Pat. No. 3,858,929 describes a cart which includes a plastic tub body and fulcrum portions which permit the tub to be tilted. However, the fulcrum portions are integrated with a rigid frame which surrounds and supports the tub.

The invention provides a bumper assembly for a plastic trailer body which cooperates with reinforcing means on the trailer body to prevent excessive deformation of the plastic body. A metal reinforcing tube is attached to the trailer body adjacent the top thereof, and a pair of U-shaped bumpers are attached to the metal supporting frame of the trailer. A connecting plate extends between the upper ends of the bumpers and is attached to the plastic body. The connecting plate includes an L-shaped angle portion which engages the reinforcing tube, and the reinforcing tube prevents the bumpers from deforming the plastic trailer body when the trailer is supported on the bumpers.

DESCRIPTION OF THE DRAWING

The invention will be explained in conjunction with the attached drawing in which FIG. 1 is a perspective view of a trailer which is provided with a bumper assembly in accordance with the invention;

FIG. 2 is an enlarged fragmentary perspective view of the bumper assembly;

FIG. 3 is a perspective view of the trailer supported in an upright position by the bumper assembly;

FIG. 4 is a side elevational view of the bumper assembly;

FIG. 5 is a rear elevational view of the bumper assembly; and

FIG. 6 is a fragmentary sectional view through the rear end of the trailer.

DESCRIPTION OF SPECIFIC EMBODIMENT

Referring first to FIG. 1, the numeral 10 designates generally a trailer which includes an open-topped body 11 and a top 12. The trailer body is supported on a metal frame or chassis 13 (see also FIG. 3), and a pair of wheels 14 are mounted on the frame. The trailer is shown attached to an automobile 15 by a hitch 16 which extends forwardly from the frame.

The trailer body is generally tub-shaped and includes a bottom wall 18 and a rectangular sidewall 19 which includes front and rear portions 20 and 21 and a pair of side portions 22 and 23. The trailer body is advantageously molded in one piece from suitable plastic, such as high density polyethylene.

The top of the side wall extends outwardly and downwardly to form a U-shaped or channel-shaped rim 25 (see particularly FIG. 6) which extends around the entire perimeter of the trailer body. A cylindrical metal reinforcing tube 26 is positioned within the channel-shaped rim and is secured to the plastic body by a plurality of strap fasteners 27 (FIG. 3). The strap fasteners encircle the tube and are attached to the trailer body by screws. The reinforcing tube is rectangularly shaped and extends around the entire perimeter of the trailer body to reinforce the trailer body and to prevent the trailer body from being excessively deformed.

The top 12 is also generally tub-shaped and is hingedly secured to the trailer body by a pair of hinges 29 which are attached to each side of the top and a pair of hinges 30 which are attached to each side of the trailer body. The hinge pairs 29 and 30 are connected by a hinge pin, and the top can be opened from either side by removing the hinge pins on one side and pivoting the top about the hinge pins on the other side.

Frame 13 includes a pair of fore and aft side angles 32 and 33 (FIG. 3) and a pair of front and rear transverse angles 34 and 35. The angles are welded together and are secured to the bottom of the trailer body by bolts 36 (FIG. 6). The axle for the wheels is connected to a pair of leaf springs 37 which are attached to the angles 32 and 33. The hitch 16 is connected to the front angle 34 and to an intermediate transverse angle (not shown) which extends between the side angles adjacent the axle.

The bumper assembly 40 includes a pair of generally U-shaped metal bumper bars or skids 41 and 42 and a metal connecting plate 43 which is welded to each of the bumper bars. Each of the bumpers is formed from a metal tube and includes a horizontally extending upper end portion 44 (FIGS. 4 and 6), a vertically extending bight or middle portion 45, and a horizontal lower end portion 46. The end of each lower portion 46 is flattened and bent downwardly to form an attaching portion 47 which is bolted to the rear angle 35 of the frame by a bolt 48.

The connecting plate 43 is provided with a pair of bolt holes 49 (FIG. 5), and the connecting plate is bolted to the rear wall of the trailer body by bolts 50 (FIGS. 2 and 6). The connecting plate includes a flat lower portion 51 which abuts the rear wall of the trailer body and an L-shaped or angle-shaped upper portion 52. The angle portion engages the reinforcing tube 26.

A pair of tail lights 53 are mounted on the rear wall of the trailer body outwardly of the bumpers 41 and 42. The bight portion 45 of the bumpers projects rearwardly beyond the tail lights to protect the tail lights and the other parts of the trailer.

The trailer can be tilted onto the bumpers to facilitate emptying the contents of the trailer. For example, if the trailer is filled with dirt, sand, gravel, etc., the hitch can be disconnected from the towing vehicle and raised to pivot the bumpers 41 and 42 downwardly into contact with the ground. The rounded portions of the bumpers between the bottom portions 46 and the intermediate portions 45 will engage the ground and support the trailer in an inclined position about 45° from horizontal. The angle portion 52 of the connecting plate 43 engages the reinforcing tube 26, and the reinforcing tube prevents the back wall of the body from being excessively deformed.

In order to dump the last portion of the load, the trailer can be tilted until the bight portions 45 of the bumpers engage the ground. The rounded corners of the bumpers facilitate this tilting movement. When the bight portions 45 of the bumpers engage the ground, the trailer will be supported in an upright or vertical position as illustrated in FIG. 3. The angle portion of the connecting plate will continue to engage the reinforcing tube 26. The weight of the trailer is therefore supported by the metal frame and by the reinforcing tube, and concentrated loads are not imposed on the plastic wall of the trailer body.

The bumpers also permit the trailer to be stored in an upright position in order to minimize the space required to store the trailer. In FIG. 3 the trailer is supported within a garage or shed by the bumpers 41 and 42, and the trailer is stabilized by a chain 55 which is attached to a wall 56 of the garage and which is connected to the hitch by a hook 57.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. In a trailer including a body having a side wall and a shaped upper rim along the upper edge portion of the side wall and reinforcing means attached to the upper rim, a bumper assembly including a pair of spaced-apart bumpers extending outwardly from the side wall, each of the bumpers having an upper end connected to a connecting plate extending between the bumpers, the connecting plate engaging the reinforcing means.

2. The bumper assembly of claim 1 in which each of the bumpers is generally U-shaped and includes a flat bight portion for supporting the trailer in an upright position.

3. The bumper assembly of claim 1 in which the rim of the trailer is generally channel-shaped and the reinforcing means comprises a tube within the channel-shaped rim.

4. The structure of claim 3 in which the connecting plate includes an L-shaped portion which engages the tube.

5. The structure of claim 1 in which the trailer includes a metal frame which supports the trailer body, each of the bumpers having a lower end attached to the frame, the connecting plate being attached to the side wall of the trailer body.

6. The bumper assembly of claim 1 in which the trailer body is molded from plastic.

7. The bumper assembly of claim 1 in which the trailer includes a metal frame which supports the trailer body, the trailer body being molded from plastic, each of the bumpers being generally U-shaped and including a lower end attached to the frame and a flat bight portion for supporting the trailer in an upright position, the connecting plate being attached to the side wall of the trailer body.

8. A trailer comprising a molded plastic body having a side wall and a generally channel-shaped upper rim along the upper edge portion of the side wall, a reinforcing tube within the channel-shaped rim, a metal frame supporting the plastic body, and a bumper assembly including a pair of spaced-apart bumpers extending outwardly from the side wall and a connecting plate extending between the bumpers, each of the bumpers being generally U-shaped and including a lower end attached to the frame, a flat bight portion for supporting the trailer in an upright position, and an upper end attached to the connecting plate, the connecting plate being attached to the side wall of the trailer body and including an L-shaped portion which engages the reinforcing tube.

* * * * *